Oct. 30, 1962   J. F. EVANS   3,061,037
SUBSURFACE SEISMIC SURVEYING
Filed June 30, 1958   5 Sheets-Sheet 1

INVENTOR:
JULIAN F. EVANS
BY Newell Pottoff
ATTORNEY

Oct. 30, 1962   J. F. EVANS   3,061,037
SUBSURFACE SEISMIC SURVEYING
Filed June 30, 1958   5 Sheets-Sheet 2
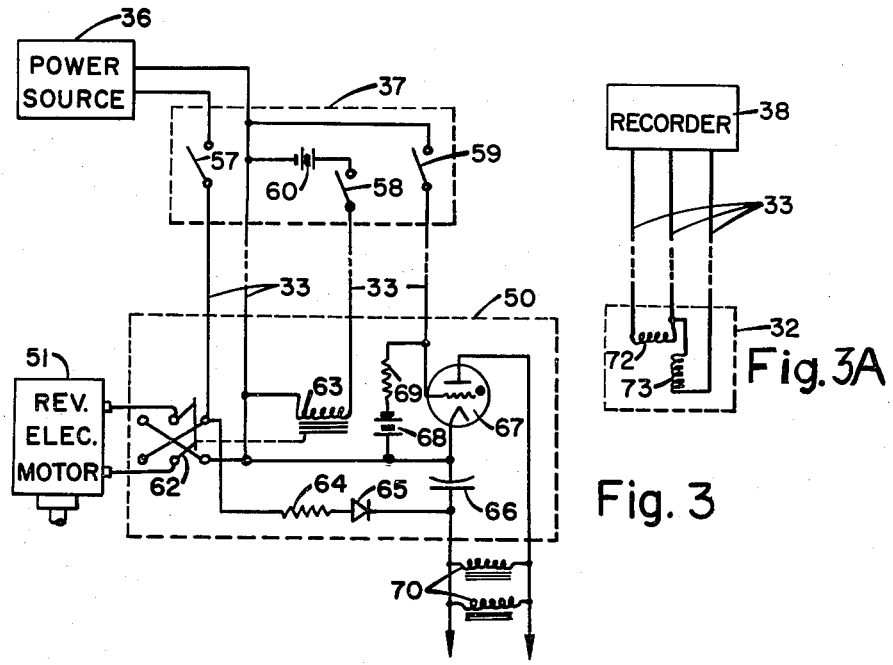
Fig. 3
Fig. 3A
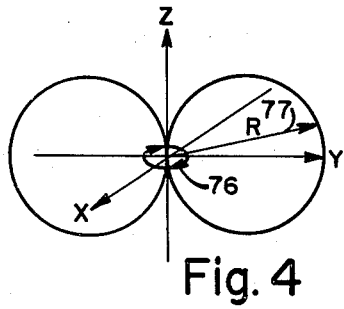
Fig. 4
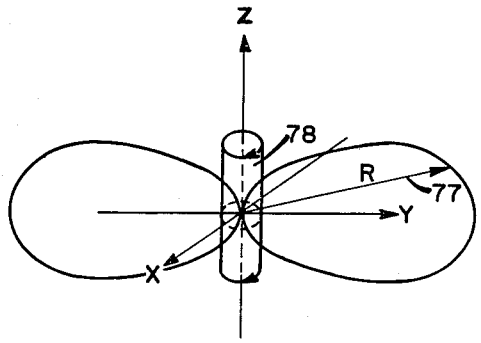
Fig. 5
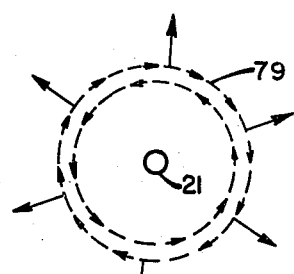
Fig. 6
INVENTOR:
JULIAN F. EVANS
BY
ATTORNEY Oct. 30, 1962 J. F. EVANS 3,061,037
SUBSURFACE SEISMIC SURVEYING
Filed June 30, 1958 5 Sheets-Sheet 3

INVENTOR:
JULIAN F. EVANS
BY Newell Pottof
ATTORNEY

Oct. 30, 1962  J. F. EVANS  3,061,037
SUBSURFACE SEISMIC SURVEYING
Filed June 30, 1958 5 Sheets-Sheet 5

INVENTOR:
JULIAN F. EVANS
BY Newell Potter
ATTORNEY

United States Patent Office 3,061,037
Patented Oct. 30, 1962

3,061,037
SUBSURFACE SEISMIC SURVEYING
Julian F. Evans, Tulsa, Okla., assignor to Pan American Petroleum Corporation, Tulsa, Okla., a corporation of Delaware
Filed June 30, 1958, Ser. No. 745,598
2 Claims. (Cl. 181—.5)

This invention relates to subsurface seismic geophysical surveying and is directed to the exploration of subsurface strata horizontally from well bores. More specifically, the invention is directed to exploring for discontinuities in subsurface low-velocity strata using guided or channeled seismic waves.

It has sometimes been assumed that ordinary compressional seismic waves can be guided or channeled in a low-velocity subsurface stratum which is bounded above and below by strata of higher seismic-wave transmission velocities. It has been observed, however, that this is strictly true only for the relatively rare instances where the compressional seismic-wave velocity of the low-velocity stratum is lower than both the seismic compressional-wave and shear-wave velocities of the bounding strata. If, as is most frequently true, the compressional-wave velocity of the channel stratum lies between the compressional-wave and shear-wave velocities for the bounding strata, then only partial channeling of the seismic waves occurs. Because shear waves can be created by the impingement of compressional waves at an oblique angle on a boundary between different strata, a substantial loss of energy from a channel stratum to other strata may occur by this mechanism, even though the angle of incidence of the compressional waves on the stratum boundary is such as otherwise to cause total reflection of these waves.

It has also been observed that where either partial or total compressional-wave channeling is possible, the waves created by a single impulse become elongated, in the course of travel, into a wave train of many cycles rather than remaining an impulse of relatively simple form. This greatly complicates the measurement of travel times by obscuring the beginning or the end of the wave arrivals.

It is accordingly a primary object of the present invention to provide a novel method and apparatus for seismically exploring subsurface strata wherein the seismic waves may be channeled or guided with maximum efficiency. A further object of the invention is to provide such a method and apparatus wherein the broadening of an original seismic-wave impulse into an elongated train of waves is minimized. A still further object is to provide such a method and apparatus in which the recordings obtained are relatively simple to interpret. Other and further objects, uses, and advantages of the invention will be apparent as the description proceeds.

Stated briefly, it has been found that, unlike compressional waves, shear waves having particle motions parallel to the boundaries of a channel stratum may be guided therein with negligible loss and with minimum broadening of the initial wave-creating impulse into an oscillatory wave train. Accordingly, if such waves encounter a discontinuity in the channel stratum, a reflected wave front is created which is similarly guided or channeled, so that its direction and travel time to a receiver in the stratum may be used, together with the wave velocity, in determining the distance and direction to the discontinuity.

As geological stratum boundaries are for the most part horizontal, the shear waves utilized in the present invention will in accordance with the common terminology of the art be referred to as SH-waves, the "S" denoting a shear wave and the "H" denoting a horizontal polarization for the earth-particle motions. It will be understood, however, that what is intended in the present invention as horizontal polarization of the particle motions is rather polarization parallel to the stratum boundaries which, of course, for an inclined or dipping stratum will not be horizontal in the geographical sense.

In its broader aspects, therefore, the present invention comprises locating, in a bore hole, a stratum of substantially lower seismic-wave transmission velocity than the bounding strata above and below, placing in the stratum in the bore hole a generator and a receiver of SH-waves, actuating the generator to produce SH-waves which enter and travel through the stratum, and directionally receiving any SH-waves which have been guided to and reflected from a discontinuity in the stratum. The direction and travel time of these waves can then be utilized for determining the distance and location of the discontinuity.

This will be better understood by referring to the accompanying drawings forming a part of this application and illustrating a typical embodiment of the invention and details thereof. In these drawings, FIGURE 1 is a diagrammatic view of a cross-section of earth penetrated by a bore hole, with the apparatus of the invention in testing position;

FIGURE 3 is a wiring diagram of the electrical control circuits;

FIGURE 3A is a wiring diagram of the detection and recording circuit;

Figure 12A:
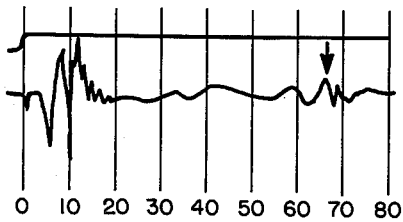
Figure 12B:
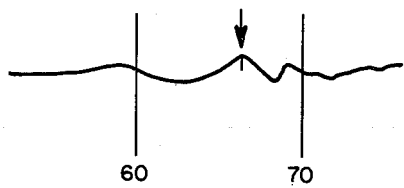
Figure 7:
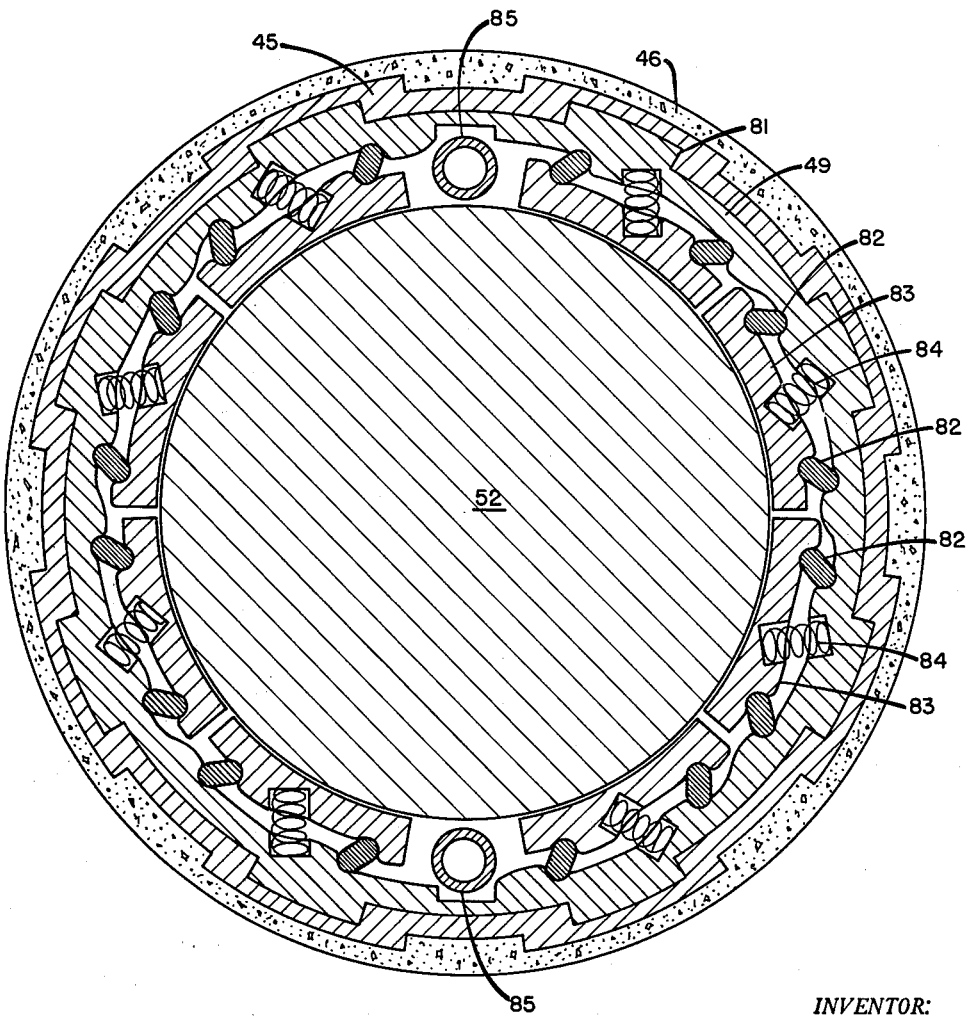
Figure 8:
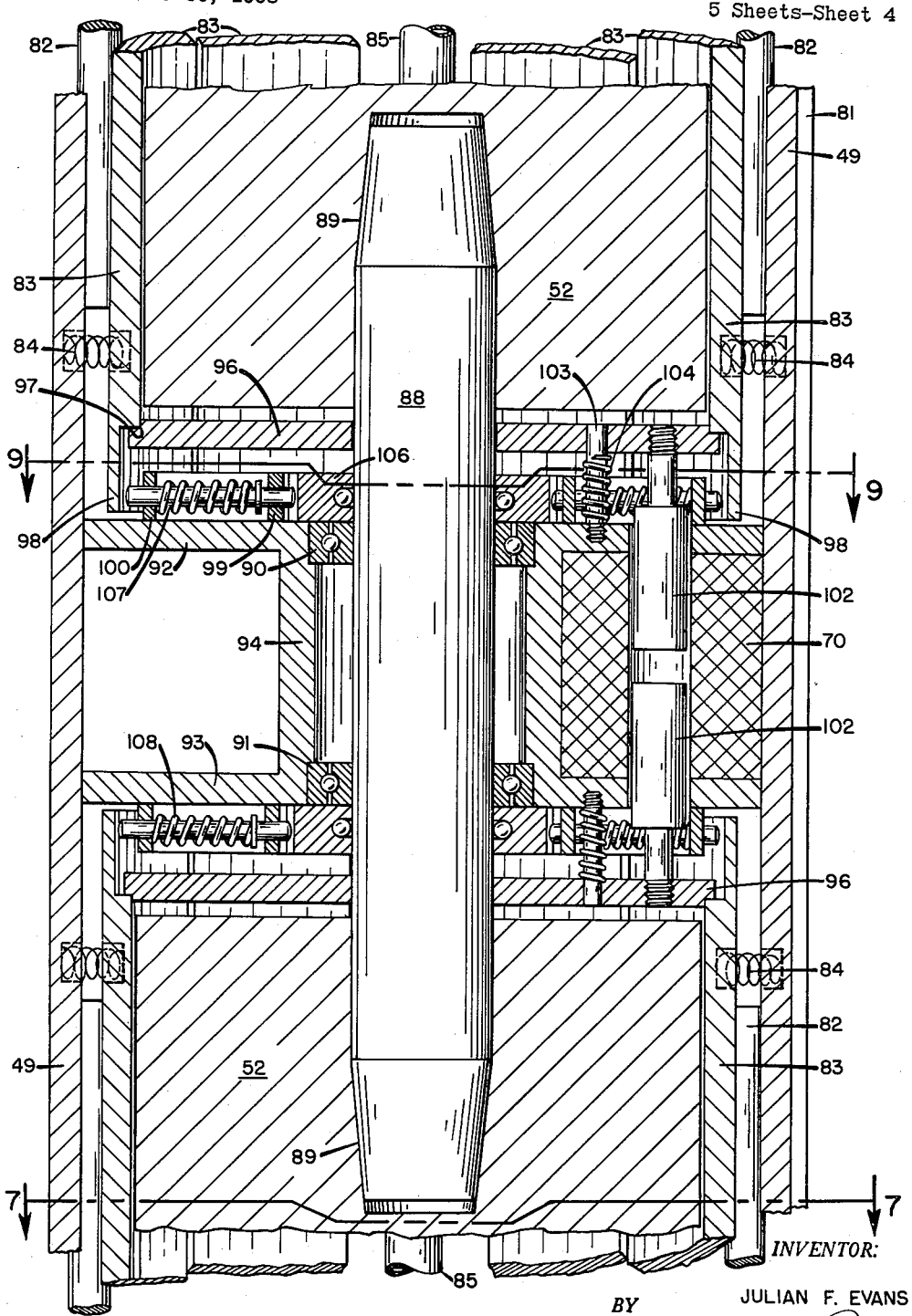
Figure 10:
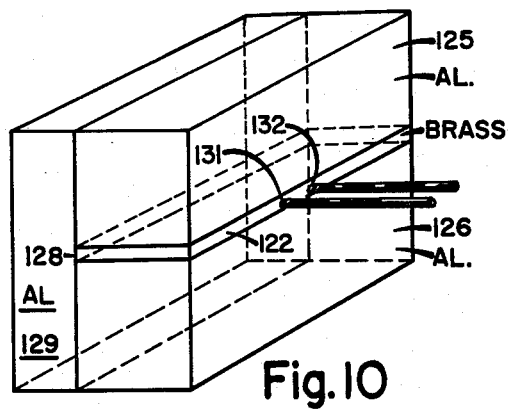
Figure 11A:
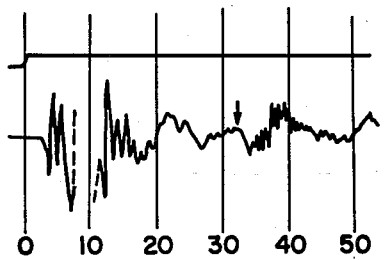
Figure 11B:
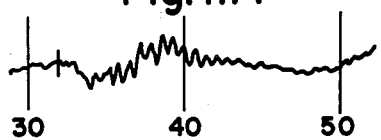
Figure 9:
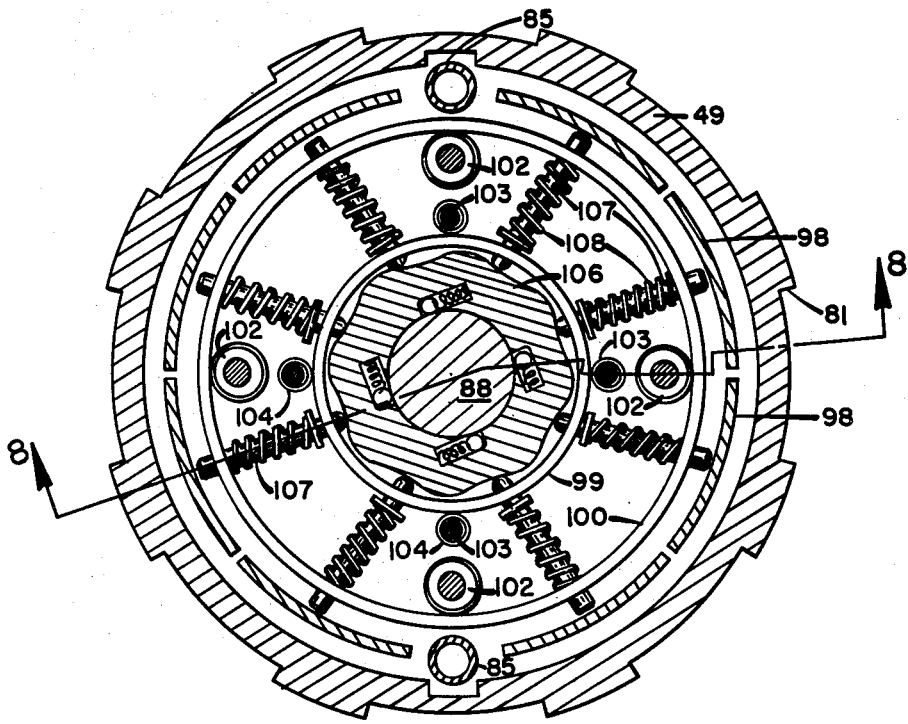

FIGURES 4, 5, and 6 are graphical representations of the distribution of particle displacements around the wave source;

FIGURE 7 is a horizontal cross-section view through a part of the wave-generating apparatus in the bore hole;

FIGURE 8 is a vertical cross-section view through a portion of the wave-generating device;

FIGURE 9 is a horizontal cross-section view along the lines 9—9 in FIGURE 8;

FIGURE 10 shows diagrammatically a model apparatus for demonstrating the invention;

FIGURES 11–A and 11–B are tracings of compressional-wave forms observed on the apparatus of FIGURE 10; and FIGURES 12–A and 12–B are tracings of SH-waves observed on the apparatus of FIGURE 10.

Figures 1, 2:
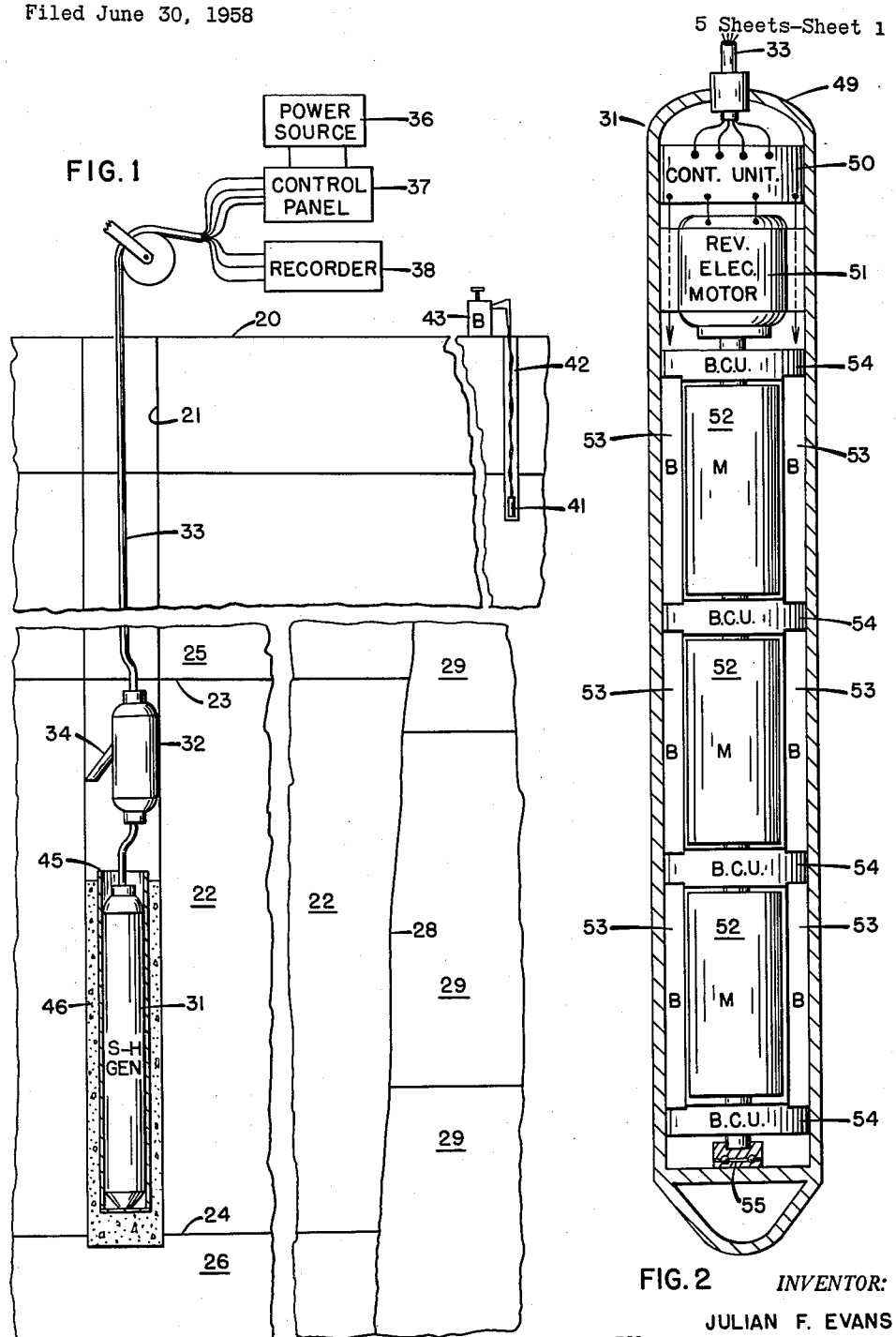
FIGURE 2 is a diagrammatic cross-section view of the wave-generating unit.

Referring now to the drawings in detail, and particularly to FIGURE 1 thereof, from the ground surface 20 a bore hole 21 extends to a sufficient depth to penetrate a stratum 22 of relatively low seismic-wave transmission velocity. Stratum 22 has upper and lower boundaries 23 and 24 respectively separating it from strata 25 and 26, respectively above and below it and of higher seismic-wave velocity. Stratum 22 thus bounded constitutes a guide or channel stratum along which seismic waves may be propagated with minimum loss of energy through the boundaries 23 and 24.

At some unknown lateral distance in an unknown direction from the well 21 the stratum 22 is interrupted by a discontinuity such as a fault plane 28 or the like which brings formations 29 into contact with the stratum 22, thereby abruptly terminating it. It may be assumed that the seismic-wave transmission properties of formations 29 are markedly different from those of stratum 22.

For the purpose of locating the direction and distance to the discontinuity 28, there is lowered into the bore hole 21 an SH-wave generator 31 and a detector 32 for SH-waves. This apparatus is preferably lowered by a multiple-conductor cable 33 from the ground surface, the detector 32 being provided with an arm 34 which may be extended for engaging the wall of hole 21 and pressing detector 32 firmly against the opposite wall. Preferably arm 34 extends itself when tension in the cable 33 is released upon generator 31 reaching its operating position in stratum 22. Connected to the various conductors of the cable 33 at the ground surface are a power source 36 operating through a control panel 37 and a recorder 38 for receiving and recording the waves picked up by the detector 32.

This detector is primarily sensitive to horizontal particle motions and, for the purpose of detecting the direction of wave travel, preferably includes two horizontal sensitive seismometer systems with their sensitivity axes mutually at right angles to each other. As such receivers are well known in the art, detailed and further description of them is deemed unnecessary. If a complete analysis of received wavemotions is desired, the detector 32 might, of course, be a conventional three-component well seismometer, as this would normally include the two horizontally sensitive units of primary interest.

For the purpose of determining the geographical direction of wave travel, it is necessary that the orientation of the horizontal sensitivity axes of detector 32 be known after the instrument is in place. This can be done in any of several ways, but a preferred method is that disclosed in U.S. Patent 2,036,824, which may be briefly described as utilizing a charge of explosive 41 in a shot hole 42 near the ground surface 20 some substantial horizontal distance away from the top of well bore 21. Upon detonating charge 41 by a blaster 43 and recording the waves as they arrive at the detector 32 from the known direction of the shot hole 42, the orientation of the detector 32 may be deduced as shown in the above patent.

In order that seismic shear waves may be emitted from the generator 31 into the stratum 22, a firm coupling must be provided between the generator and the bore-hole wall. Preferably, this is done by providing a splined casing 45 into which the generator 31 may be lowered to engage the splines, and cementing the splined casing 45 to the wall of the hole by cement 46. The casing 45 preferably has vertical grooves also on its outer surface so that firm bonds between the casing and the cement as well as between the cement and the bore-hole wall are provided when the cement 46 has set.

Further general details of the SH-wave generator 31 are shown in FIGURE 2. Thus, the generator comprises a splined outer housing 49 adapted to engage the casing 45. Within the housing 49 is a control unit 50 from which extend electrical leads for supplying current to drive a reversible electric motor 51. Coupled to each other and to the motor 51 are a plurality of rotatable cylindrical masses 52 closely confined between braking units 53 fixed to the wall of the housing 49. At the ends of the respective masses 52 are a number of brake-controlling units 54. The weight of the masses 52 is supported for rotation by a thrust bearing 55 at the bottom of housing 49.

FIGURE 3 shows the electrical elements of the control system of the invention. Thus, the surface control panel 37 includes switches 57, 58, and 59, the switch 57 controlling the application of power from the source 36 to the control unit 50 in the subsurface wave-generating unit. There the power is applied through a reversing switch 62 to the reversible electric motor 51, the direction of rotation of the motor being determined by the position of the switch 62. The operation of switch 62 is determined at the panel 37 by the switch 58 which controls the application of voltage from a source 60 to the switch-operating solenoid 63 in the well control unit 50.

The voltage from source 36 is applied also through a resistor 64 and rectifier 65 to a charge-accumulating condenser 66. The discharge of the condenser is controlled by a thyratron tube 67 in series therewith, the tube 67 being prevented from firing by a bias voltage 68 applied through a resistor 69 to the control grid. However, upon closing the switch 59 in the surface control panel 37, this bias can be reduced to zero so that the tube 67 fires and discharges the condenser 66 through the brake-operating solenoids 70 connected in parallel with each other and in series with the thyratron 67 and condenser 66. By having condenser 66 of a substantial capacity and charged to a relatively high voltage, a high current flow can be rapidly built up in the solenoid coils 70 insuring rapid and effective action.

As is shown in FIGURE 3A, the detector coils 72 and 73 of the horizontal seismometer units respectively at right angles to each other are connected to the recorder 38 by separate conductors of the cable 33.

In operation, with the apparatus positioned as shown in FIGURE 1 the switch 57 is closed and power is applied through the switch 62 to the motor 51 for a sufficient length of time to bring the masses 52 up to a desired high speed of rotation. At the same time the condenser 66 has been brought up to a full electric charge at high voltage. Then, in order to generate seismic waves, the switch 59 is closed to discharge condenser 66 through the brake-setting solenoids 70, which operate on the brake units 53 instantaneously to cause them to engage the masses 52. Thereby the rotational energy of these masses is transferred throug the brake units 53, the housing 49, and the cement sheath 46 surrounding the casing 45 to the bore-hole wall as an impulse of torque about the bore-hole axis. This torque impulse, which amounts to an impulse of force everywhere tangential to the wall and substantially parallel to the boundaries 23 and 24, produces horizontal particle motions of the bore-hole wall which are propagated as an SH-wave front radially outwardly from the bore hole through the stratum 22. Upon encountering the discontinuity 28, reflection of a portion of this energy occurs, and it returns through the channel stratum 22 to the detector 32 where it is received and transmitted for recording by the recorder 38.

The manner in which the desired SH-waves are generated can be better understood by reference to FIGURES 4, 5, and 6. In FIGURE 4 is shown a diagrammatic particle-displacement pattern for a torque ring 76 at a distance from the ring which is large compared to its diameter. Thus, if it be assumed that the plane of the ring coincides with the XY plane of the XYZ coordinate system and that the center of the ring is at the system origin, then the arrow 77 represents by its length and direction the magnitudes of horizontal particle displacements in the corresponding various directions from the origin at a given instant following the generation of waves by a torque impulse applied to the ring 76. As appears in FIGURE 4, the tip of arrow 77 describes circles in the YZ plane tangent to each other and to the Z axis and passing through the center of ring 76. Since the system is symmetrical about the Z axis, similar circles describe the particle displacements in the XZ plane. Stated in its simplest terms, FIGURE 4 means simply that the particle displacements produced by the ring source 76 are a maximum in the horizontal direction and are zero in the vertical directions—i.e., along the Z axis.

In FIGURE 5 is shown the modification of the particle-displacement pattern to be expected when the ring source 76 is elongated into a cylindrical source 78, which corresponds to the action of the generator 31. In this case the displacement vectors 77 become elongated in the horizontal direction because the effect of a number of discrete ring sources 76 is additive in the horizontal direction, whereas in the vertical or Z-axis direction there is some mutual interference of the energy, if the length of the cylindrical source 78 is substantial in comparison with the wave length of the seismic SH-waves, as is normally the case. Consequently, it is apparent that the cylindrical source of FIGURE 5, which is approximated by the generator 31, is even more selectively directional in the horizontal direction than the simple ring source of FIGURE 4. Accordingly, at a short time after the torque impulse is applied to the walls of bore hole 21, this impulse will, as is shown in FIGURE 6, spread out radially through the formation 22 as the wave front 79.

Here the circular arrows represent the actual particle displacements in the wave front and in the succeeding phase of the impulse. That is, the clockwise arrows represent the particle motions in the wave front, while the counterclockwise arrows represent the movements of the particles as they return to equilibrium when the wave front passes. The radial arrows represent the direction of travel of the wave front 79, and accordingly it is apparent that these are SH-waves with respect to the boundaries of the stratum 22. Since the shear-wave velocity of this stratum is definitely less than either the shear-wave or compressional-wave velocities of the strata 25 and 26, it is apparent that the guiding of this energy, emitted directionally as shown in FIGURE 5, will be performed efficiently by the boundaries 23 and 24. The conversion of the particle-displacement energy at these boundaries into other wave forms in the outside strata 25 and 26 is minimized because of these wave-velocity relationships.

Certain further details of the shear-wave generator 31 are shown in FIGURES 7, 8, and 9. Thus, as appears in FIGURE 7, the housing 49 has external splines 81 to engage complementary grooves in the casing 45, which in turn has external grooves for engaging the cement sheath 46 between the casing 45 and the bore-hole wall. The housing 49 is thus secured against rotation to the bore-hole wall while remaining freely movable lengthwise.

On the inside of housing 49 are pairs of vertically elongated compression toggle levers or short struts 82 which engage a plurality of brake shoes 83 held close to but just out of contact with the surface of each cylindrical mass 52. A plurality of compression springs 84 between the housing wall 49 and the shoes 83 urge the shoes in the direction of each mass 52, which is assumed to rotate in a clockwise direction as seen in FIGURE 7.

As will be obvious, the toggle levers 82 and shoes 83 comprise self-energizing brakes tending to increase their pressure against each mass 52 as soon as an initial contact with the rotating mass is made. Conduits 85, in openings between the ends of various ones of the brake shoes 83, provide spaces for electrical conductors to pass along the length of the unit 31.

In FIGURE 8 are shown in some detail certain features of a typical unit 54 for controlling the action of the brake shoes 83. Also shown are some further constructional details of the generator 31. The entire rotatable mass of the wave generator 31 is broken up into the several somewhat smaller units 52, adjacent units being joined end to end by a short shaft 88 which is tapered at its ends to engage a tapered seat 89 centered within each of masses 52. Each shaft 88 is given lateral support and centered within the housing 49 by a pair of bearings 90 and 91, centered in a pair of disc-shaped supporting members 92 and 93 contacting the wall of housing 49 and spaced apart by the frame member 94. Together with the thrust bearing 55 at the bottom of the housing, these bearing units provide complete vertical and lateral support for the mass units 52, each of which is preferably dynamically balanced so as to rotate with the least possible lateral vibration.

The brake shoes 83 are held just out of contact with the surface of mass units 52 by a latching disc 96 having in its outer circumference a notch 97 which engages each of the shoes. Each latching disc 96 is movable axially along the shaft 88. This movement is controlled or accomplished by attachment to a plurality of solenoid cores 102 surrounded by the respective coils 70 which, when energized by the strong electric-current impulse from the condenser 66, cause the cores 102 to pull the two latching plates 96 of each unit 54 toward each other and away from the masses 52. This allows the brake shoes 83 to move toward and engage the surface of masses 52 under the driving force of the compression springs 84. This unlatching movement of the discs 96 is opposed by a plurality of compression springs 103 on guide pins 104 carried by the supporting-frame discs 92 and 93.

As is most clearly shown in FIGURES 8 and 9, each shoe 83 has an extension 98 which extends past the edge of the adjacent latching disc 96 and remains out of contact therewith at all times. Each of the bearing-supporting discs 92 and 93 carries a pair of concentric guide rings 99 and 100 through which extend a plurality of cam-follower pins 107 which engage a one-way ball-clutch-driven cam 106 surrounding shaft 88 and extend into engagement with the brake-shoe extensions 98. A compression spring 108 between the outer guide ring 100 and a shoulder on each pin 107 holds the pin in engagement with the cam surface of the cam 106.

The operation of this mechanism can best be understood by assuming that for SH-impulse generation the masses 52 rotate in a clockwise direction as viewed in FIGURES 7 and 9. When they have been brought to a sufficient speed of rotation by the electric motor 51, and a seismic-wave impulse is to be generated, closing the switch 59 in the surface control panel 37 energizes the solenoid coils 70 and causes a quick and simultaneous movement of each latching disc 96 to release the shoes 83. Urged by springs 84, they thereupon tightly engage the masses 52 due to the powerful self-energizing action of the shoes 83 and toggle levers 82, and a sudden torque impulse is transferred to the housing 49 and thence through the cement 46 to the well formation 22.

The interconnection of the different masses 52 substantially only by frictional engagement of each shaft 88 with the tapered seats 89 permits differential rotations of adjacent masses 52 to occur during the braking action of the shoes 83, if such rotations become necessary due to the fact that the shoes 83 do not all engage exactly simultaneously. Thus, some slippage may occur at the tapered seats 89 to prevent twisting the shaft 88 in two.

As appears most clearly in FIGURE 9, for clockwise rotations of the masses 52 the ball-clutch members of cam 106 permit free rotation of the shaft 88. However, when the switch 62 is reversed by action of the solenoid 63, under control of the switch 58 in panel 37, the reverse rotation of the shaft 88 by the motor 51 causes the ball clutches of cam 106 to engage this shaft. Accordingly, for this counterclockwise rotation of the masses 52 and connecting shafts 88, the cam 106 is rotated therewith and causes simultaneous outward movement of all of the cam-follower pins 107. Each pin engages the extension 98 of one brake shoe 83 to lift it away from the mass 52. At the maximum-radius position of cam 106 all brake shoes 83 are simultaneously moved outwardly far enough for the notch 97 of latching disc 96 to engage all the shoes. The springs 104 urge the plate 96 toward the nearest mass 52 so that latching occurs. Thus, each brake-control unit 54 includes means not only for simultaneously initiating engagement of all of the brake shoes of units 53, but also means for resetting these brake shoes in the disengaged position for subsequent generation of another seismic-wave impulse.

In FIGURE 10 is shown diagrammatically an apparatus designed to illustrate the principles of the present invention. This is a model apparatus in which a layer of brass 122 simulating the layer 22 is imbedded between layers of aluminum 125 and 126 simulating the layers 25 and 26. The brass layer 122 is abruptly terminated by the fault 128 formed by a block of aluminum 129 against the end of the layer. The seismic-wave velocities of these two materials correspond in a general way to those of the layers of FIGURE 1, in that the velocity for brass is substantially less than for aluminum. Consequently, the brass layer 122 is capable of acting as a wave guide.

For the purpose of these tests there was placed against the exposed edge of the brass layer a seismic-wave generator 131 and receiver 132 held in position by suitable mounting rods. By proper choice of the transmitter and receiver, it was possible to transmit and receive either compressional waves or shear waves, the latter with polarizations either parallel or perpendicular to the boundaries of the brass layer.

In FIGURE 11-A is shown a representative trace of the received waves when using a compressional transducer for emitting and receiving the waves. FIGURE 11-B is a copy of the reflected-wave portion of FIGURE 11-A on an expanded time scale. It is obvious that the detected compressional waves are of exceedingly complex form, the reflected waves beginning at a time shortly following 30 microseconds being a quite long oscillatory train.

This time, designated by the arrow in FIGURE 11-A and by the short vertical mark in FIGURE 11-B, is the event of principal interest; but it is only one of many waves, some of which have larger amplitudes.

On the other hand, when the transducers are both of SH-wave form, the detected wave is as shown in FIGURE 12-A where it is obvious that the most prominent reflected energy return marked by the arrow and occurring at a time between 60 and 70 microseconds is a very strong single event. FIGURE 12-B, which is part of FIGURE 12-A on an expanded time scale, shows this even more clearly. In view of such large differences in character of the two records in the simple case of the model of FIGURE 10, it seems apparent that the use of SH-waves for exploration in the much more complex layered earth offers unique and unexpected advantages.

While my invention has been described with reference to the foregoing details and embodiments, it is to be understood that it is not to be considered as limited to these details, but its scope is properly to be ascertained from the appended claims.

I claim:

1. In a method of subsurface geophysical exploration for locating a discontinuity in a stratum penetrated by a bore hole and of low seismic-wave velocity relative to the higher seismic-wave velocities of the bounding strata above and below said stratum, by transmitting seismic waves along said stratum to be guided between the upper and lower boundaries thereof and reflected by said discontinuity to a detection point within said bore hole and stratum, the steps comprising, at a depth in said bore hole between said boundaries, rotating a cylindrical elongated mass at high speed about an axis substantially coincident with the bore-hole axis, suddenly coupling said rotating mass to the bore-hole wall adjacent thereto, whereby its rotational energy is converted into a torque impulse at said wall, and whereby an SH-wave impulse is created which propagates substantially uniformly in all directions radially away from said bore hole through said stratum, detecting at said detection point any shear waves returning thereto after reflection from said discontinuity, and recording as functions of time the components of said detected waves resolved in two known perpendicular directions parallel to said stratum boundaries.

2. In apparatus for subsurface geophysical exploration for locating a discontinuity in a stratum penetrated by a bore hole and of low seismic-wave velocity relative to the higher seismic-wave velocities of the bounding strata above and below said stratum, by transmitting seismic waves along said stratum to be guided thereby between the upper and lower boundaries thereof and reflected from said discontinuity to a detector within said stratum, the improvement comprising, in combination, a housing adapted to be lowered into and secured against rotation to the wall of a well bore, a cylindrical mass within said housing rotatable about the longitudinal axis thereof, means within said housing for rotating said mass at high speed to store a substantial amount of energy therein in the form of rotational energy, means for engaging said mass suddenly to couple it to said housing and thence to a bore-hole wall, means for controlling said coupling means, wave-detecting means spaced from said housing adapted to detect SH-waves having polarizations substantially parallel to the boundaries of said stratum, and means connected to said wave-detecting means for recording as functions of time the components of said waves resolved along two known perpendicular directions parallel to the boundaries of said stratum.

References Cited in the file of this patent

UNITED STATES PATENTS 2,718,929     Weiss _____ Sept. 27, 1955
2,740,489     White et al. _____ Apr. 3, 1956